United States Patent [19]

Yasuda et al.

[11] 3,886,100

[45] May 27, 1975

[54] METHOD OF MANUFACTURING POLYMER PARTICLES HAVING UNIFORM CROSS-LINKING AND EXPANDED SHAPED ARTICLES OBTAINED THEREFROM

[75] Inventors: Yoshizo Yasuda; Itaru Hatano; Yasuyuki Suganuma; Tomohumi Kameo, all of Kobe, Japan

[73] Assignee: Kanegafuchi Kagaku Kogyo Kabushiki Kaisha, Osaka, Japan

[22] Filed: June 28, 1974

[21] Appl. No.: 484,253

Related U.S. Application Data

[63] Continuation-in-part of Ser. No. 237,967, March 24, 1972, abandoned.

[30] Foreign Application Priority Data

Mar. 25, 1971  Japan............................... 46-17713
Mar. 25, 1971  Japan............................... 46-17714
Mar. 25, 1971  Japan............................... 46-17715

[52] U.S. Cl......... 260/2.5 B; 260/2.5 HA; 260/87.3; 260/93.7; 260/94.9 GA; 260/889; 260/897 R; 260/897 C; 264/51

[51] Int. Cl. ... C08f 47/10; C08f 27/00; C08f 29/04

[58] Field of Search .... 260/94.9 GA, 2.5 B, 2.5 HA

[56] References Cited

UNITED STATES PATENTS

| | | | |
|---|---|---|---|
| 3,242,159 | 3/1966 | Kaufman..................... | 260/94.9 GA |
| 3,449,191 | 6/1969 | Taylor......................... | 260/94.9 GA |
| 3,452,123 | 6/1969 | Beckmann et al. ......... | 260/94.9 GA |

FOREIGN PATENTS OR APPLICATIONS

| | | | |
|---|---|---|---|
| 45-36,623 | 10/1970 | Japan .............................. | 260/2.5 B |
| 45-32,622 | 10/1970 | Japan .............................. | 260/2.5 B |

*Primary Examiner*—Wilbert J. Briggs, Sr.
*Attorney, Agent, or Firm*—Moonray Kojima

[57] ABSTRACT

Method of manufacturing polyolefin resin particles cross-linked uniformly by impregnating uniformly cross-linking agent into polymer particles and performing cross-linking reaction in an aqueous suspension containing a small amount of surface active agent, cross-linking agent, such as organic peroxide, polyolefin resin particles, and inorganic metallic salt. Expandable cross-linked polymer particles and expanded shaped articles are obtained therefrom.

14 Claims, No Drawings

METHOD OF MANUFACTURING POLYMER PARTICLES HAVING UNIFORM CROSS-LINKING AND EXPANDED SHAPED ARTICLES OBTAINED THEREFROM

This is a continuation in part of Ser. No. 237,967 filed 3/24/72, and now abandoned.

BACKGROUND OF INVENTION

This invention relates to methods of manufacturing particles of polyolefin resin cross-linked uniformly, and expandable cross-linked polymer particles obtained therefrom.

Cross-linked polyolefin resin particles are used for manufacturing expanded shaped articles by adding foaming agent to the resin particles, or for manufacturing shaped articles by thermal or rotating molding methods from the cross-linked polyolefin resin particles. Conventional methods of producing cross-linked polyolefin resin particles from polyolefin resin particles using cross-linking agents such as organic peroxide, have numerous disadvantages, especially when used on an industrial scale, because of the many complex steps required in the method.

For example, according to the conventional method, polyolefin resin is mixed with organic peroxide by a kneader, and rolled to form a sheet. The sheet is heated to perform cross-linking, and cut to small pieces by a sheet cutter, thus to form cross-linked polyolefin resin particles.

Instead of the foregoing method, a method requiring many complex processes, a direct method may be used leading to cross-linked polyolefin resin particles in one step. In such a method, for example, a mixture of polyolefin resin and organic peroxide is molded using an extruder during cross-linking reaction. Even this method has disadvantages in that cross-linking resin clogs the machine and the molded resin becomes rough and sometimes cracks. Products having smooth surfaces are not obtained therefrom due to marked decrease in fluidity as cross-linking reaction proceeds. Thus, it is extremely difficult to manufacture cross-linked polyolefin resin particles of desired quality.

In another method, cross-linking reaction proceeds during mixing of polyolefin resin and organic peroxide using a roll kneader. This method does not produce cross linked polyolefin resin particles of good quality because the sheet formed by the machine shrinks and is not heated uniformly as the cross-linking proceeds.

Another method in which the cross-linking reaction was carried out in an aqueous suspension of polyolefin resin particles containing organic peroxide and dispersing agent, such as polyvinyl alcohol. This method did not produce homogeneous polyolefin resin particles because inhomogeneous cross-linking reaction occured in each particle containing organic peroxide inhomogeneously.

The cross-linking reaction was usually carried out at a temperature as high as 130°C to 160°C in order to initiate the cross-linking reaction of polyolefin resin effectively and using cross-linking agent, such as organic peroxide. Since the aqueous suspension system above mentioned may also be heated above the melting point of polyolefin resin particles, adhering by melting between the particles may easily occur to form larger blocks.

SUMMARY OF INVENTION

The inventors performed numerous experiments on cross-linking processes in order to find a one step method in which cross-linked polyolefin resin particles could be produced from polyolefin resin particles, and to find a method of manufacturing expandable cross-linked polymer particles and expanded shaped articles obtained therefrom.

An illustrative embodiment of the invention encompasses a method of manufacturing polymer particles having uniform cross-linking, wherein particles of polyolefin resin, a small amount of surface active agent, a cross-linking agent, such as organic peroxide, and inorganic metallic salt are suspended in water, and the suspension system is heated to a temperature at which penetration of the cross-linking agent into the polymer particles and the cross-linking reaction occur therein.

Another illustrative embodiment encompasses a method of manufacturing foamable cross-linked polymer particles wherein polyolefin resin particles, a small amount of organic peroxide and inorganic metallic salt are dispersed in water. The dispersion is heated at a temperature at which the cross-linking agent can impregnate into the resin particles and cross-linking reaction can occur. Thus, homogeneous cross-linked polymer particles are produced having gel content of about 10% to 70%, to which foaming agent is added.

A further illustrative embodiment encompasses a process for manufacturing expanded shaped product of polyolefin resin which comprises dispersing polyolefinic resin particles, small amount of surface active agent, a cross-linking agent, such as organic peroxide and finely pulverized difficulty soluble inorganic salt in water, heating said aqueous dispersion to a temperature, at which the cross-linking agent can impregnate into the resin particles and cross-linking reaction can occur to produce homogeneous cross-linked polymer particles having gel content of from 10% to 70%, adding foaming agent to the polymer particles, followed by pre-foaming procedure. The resulting pre-foamed polymer particles have incorporated therein foaming agent and are subjected to foaming with the application of heat.

The polymer particles and expanded shaped products produced thereby both have inorganic metal salt adhered to the surfaces of the particles.

DETAILED DESCRIPTION OF PREFERRED EMBODIMENTS

The invention is illustrated further in the following Table 1. (Shown divided in two parts merely for space purposes) which shows the Suspension Stability of Reaction System and Homogeneity of Linking on Cross-Linking Reaction of Polyethylene in Aqueous Suspension Systems.

Table 1 (part 1)

| Sample Number | Method of Addition of Organic Peroxide | Type of Dispersing Agent in Suspension |
|---|---|---|
| 1 | Pure Dicumyl-peroxide without solvent or Dispersion Medium | P.V.A. (polyvinyl alcohol) |
| 2 | The same as above One Part of Dicumyl Peroxide Dissolved in | Calcium Phosphate |
| 3 | 5 Parts of Xylene, then | P.V.A. |

Table 1 (part 1)-Continued

| Sample Number | Method of Addition of Organic Peroxide | Type of Dispersing Agent in Suspension |
|---|---|---|
| | the Solution was added | |
| 4 | The same as above | P.V.A. |
| 5 | Dicumyl Peroxide was Solubilized or Dispersed in Aqueous Solution of Surfacant (surface active agent) and Then the Solution was added | P.V.A. |
| 6 | The same as above | Calcium Phosphate |

Table 1 (part 2)

| Sample Number | Reaction Temperature Multiplied by Reaction Time (°C×hr) | Stability of Dispersed Particles | Gel Content (%) | |
|---|---|---|---|---|
| | | | Average Gel Content | Deviation of Each Particle |
| 1 | 120 × 20 | Stable Particle | 52 | Large Deviation Inhomogeneously Cross-linked |
| 2 | 140 × 4 | Stable Particle | 55 | Same as Above |
| 3 | 120 × 20 | Almost Stable Partly Blocked | 2.2 | Small Deviation Homogeneously Cross-linked |
| 4 | 140 × 4 | Unstable Forms Blocks | *1 | — |
| 5 | 140 × 4 | Unstable Forms Blocks | *1 | — |
| 6 | 140 × 4 | Stable Particles | 56 | Small Deviation Homogeneously Cross-linked |

*1 means gell content of cross-linked particles could not be measured due to block formation.

Detailed Description of Experiments as set forth in Table 1.

Dicumyl peroxide (0.5 parts) was added under stirring, by the method illustrated in Table 1, into a pressure vessel which contained particles of high pressure polyethylene (100 parts manufactured by Mitsui Polychemicals Co. Ltd and sold under the Trade Mark MIRASON-9), and water (200 parts) containing dispersing agent (0.3 parts). Wherever "parts" are mentioned herein it is to be understood to be parts by weight. After substituting air with nitrogen gas, the mixture was heated to a desired temperature in 1.5 hours, kept at the temperature for a period specified in Table 1, then cooled and taken out.

Samples 5 and 6 were prepared by adding 0.5 parts of dicumyl-perixode dispersed in water (15 parts) containing NEOPELEX (0.03 parts)(NEOPELEX is a Trade Mark of Kao Soap Company, Ltd), and then by dispersing the mixture under heating. Therefore, the amount of water used for dispersing resin particles was reduced to 185 parts.

P.V.A. used as a dispersing agent was polyvinyl alcohol GH-23 (Trade Mark of Nippon Synthetic Chemical Industry Co.)

Calcium phosphate was prepared from trisodium phosphate and calcium chloride.

Gel content is defined as an insoluble fraction of a sample kept in boiling xylene for 48 hours. The average gel content is obtained by the same measurement for a number of particles picked up by random sampling. Deviation of particles can be determined as a deviation of gel contents measured for two types of foamed particles, one in a cell structure foamed homogeneously and the other in a cell structure foamed inhomogeneously. Both types of particles are prepared by expanding the cross-linked particles containing 10 parts of dichlorodifluoro methane as a foaming agent under steam pressure of 1 $kg/cm^3$ for 30 seconds.

In the present invention, the surface active agent is added in order to mix cross-linking agent, such as organic peroxide, in a polyolefin resin particle homogeneously. By addition of aqueous solution of surface active agent containing solubilized or finely dispersed cross-linking agent, such as organic peroxide, into the dispersion system, the cross-linking agent dispersed in the aqueous suspension system contacts with polyolefin resin particles homogeneously, and penetrates into the resin particles easily by the presence of the surface active agent and can be contained homogeneously in the particles.

Furthermore, it is important to select a suitable surface active agent, which is used, because the surface active agent contained in the resin particles along with the cross-linking agent may affect the diameter of foam in the foamed structure.

The resin particles containing cross-linking agent in the aqueous suspension is heated to a relatively high temperature in order to perform cross-linking reaction effectively. Care should be taken to select a suitable dispersing agent to prevent mutual adhesion of particles at time of melting.

Organic polymer dispersant, which is usually used in suspension polymerization of styrene, such as polyvinyl alcohol, is not suitable for the present invention because of its poor protecting power. When such dispersant is above melting point, adherence may occur between polyolefin particles to form larger blocks.

Inorganic metallic salts is preferably used as a protection agent in aqueous suspension of polyolefin particles, and such salts may be used even at high temperatures. In the present invention, the polymers that are employed as polyolefin resin particles are high pressure polyethylene; polyethylene; polyolefins, such as polypropylene; copolymer of ethylene and vinyl monomers, such as vinyl acetate, produced by a medium or low pressure method; blend of two or more of the foregoing polymers; and a blend of one or more of the foregoing polymers and one or more of thermoplastic resins, such as polystyrene and its copolymers; polybutadiene and its copolymers and polyvinyl chloride and its copolymers.

Any shape of polyolefin particles, e.g. spherical, ellipsoidal, cylindrical, cubic, rectangular shaped chips of from 1 mm to 10 mm in size is suitable for the present purposes. There is no limitation in shape and size of particles, however, and such shape and size should be selected depending on use.

For a cross-linking agent, and compound may be used which is capable of forming free radical and inducing cross-linking reaction in polyolefin resins. Usually the compounds are organic peroxides. These compounds include dicumyl peroxide, 2.5-dimethyl 2.5 (di-tertiary butyl peroxy) hexane, di-tertiary butyl perphthalate, tertiary butyl hydroperoxide, and others. Suitable choice of type and quantity of organic peroxide used as a cross-linking agent should be made dependent upon the type of polyolefin resin and desired degree of cross-linking, but it is preferable that less than 3% by weight of peroxide compound based upon weight of the resin, be used.

Moreover, cross-linking reaction of polyolefin may be performed by using polyfunctional monomer, such as divinyl benzene, etc, or acetylene. Such monomers are used with cross-linking agent, as agents which increase efficency of cross-linking polyolefin.

Surface active agent suitable for the present invention are non-ionic surface active agent, such as polyoxyethylene octyl phenol ether (Trademark EMAL-GEN 810, a product of Kao Soap Co., Ltd), anionic surface active agent such as dodecyl benzene sulfonate (Trademark NEOPELEX, a product of Kao Soap Co., Ltd) and sodium dialkyl sulfonsuccinate (Trademark PELEX CTP, a product of Kao Soap Co., Ltd), amphoteric surface active agents, anionic surface active agents, and others.

The surface active agent should solubilize or finely disperse organic peroxide in surfact active agent containing aqueous solution, at room temperature or under heating. The agent should not markedly disturb the cross-linking reaction and the suspension stability of polyolefin particles. Accordingly, a suitable type or kind and amount of dispersant must be chosen to attain these objectives. One may use a mixture of two or more of the foregoing. The amount of surface active agent may be from 5 to 50 percent, or more in some cases, by weight of the organic peroxide compound. Furthermore, surface active agent solution may be used added with organic peroxide solution in lower alcohols, such as methanol.

Inorganic metallic salts which may be used as dispersant are metallic phosphates, oxides, bydroxides and inorganic metallic salts, such as calcium phosphate, zinc phosphate and aluminum hydroxide, which are excellent as dispersants, and do not disturb cross-linking reactions. It is preferred that concentration of metallic salt be less than 1 % by weight of resin particles. The choice of amount of metallic salt is dependent upon the nature of the salt, type of resin material, type and amount of surface active agent, and temperature.

The present invention provides a direct method of manufacturing cross-linked polyolefin particles by carrying out both the penetration of cross-linking agent, such as organic peroxide, into the particles and cross-linking reaction in aqueous suspension of resin particles, in one step.

A foaming agent of thermal decomposition type is favorably used as a foaming agent for cross-linked polyethylene. Such agent is especially advantageous in that it has excellent quality of storage when foamed articles are produced from cross-linked polyethylene particles. However, the foaming agent has the disadvantages of being expensive and producing residuals of thermal decomposition which remain inthe article and foaming efficiency may be poor.

On the other hand, a foaming agent of a type which is gaseous at standard pressure and temperature or is easily volatile, has advantages, in that it is less expensive than thermal decomposition types of foaming agent, and in that almost no residuals remain in molded products because of the high volatility. Therefore, it is advantageous in the present invention, that molded articles can be produced using uniform foamed mateerial. The foamed material is obtained with high foaming efficiency from cross-linked polyethylene particles using foaming agent of easily volatizeable or vapor phase at normal pressure and temperature.

Suitable gel content depends upon the type of resin to be used or type of foamed mold articles desired. (When "type" is referred to herein, it is in most case intended to mean "kind", or a particular one selected from a group). In the present invention, the gel content of homogeneously cross-linked polymer particles is preferably from 10% to 70%. Because foaming efficiency is unfavorably low when gel content of polymer particles is lower than 10% and foamed material may be easily shrunk. Foaming is unfavorably difficult when gel content is higher than 70%.

The gel content can be determined as unextractable amount of specimen which is subjected to extraction with boiling xylene for 48 hours.

The foaming agents suitable for the invention are saturated or unsaturated hydrocarbons, aliphatic such as butane, propane or isopentane, alicylic such as cyclopentane; halogenated hydrocarbon such as dichloro difluoro methane, dichlorotetrafluoroethane, methyl chloride or ethyl chloride. Among them, gaseous Freon compounds are preferred. Such foaming agents are preferably used in a concentration of from 1% to 20% by weight of resin particles. The foregoing may be used singly or in mixture of two or more. The selection of the type and concentration of foaming agent is made, dependent upon type of substrate resin, desired degree of cross-linking and quality of final shaped articles.

In the present invention, aqueous suspension of inorganic metallic salt may be added to a mixture comprising resin particles and surfactant aqueous solution containing solubilized or finely dispersed organic peroxide as a cross-linking agent, at a time before heating. Also other procedures may be used. For example, polyolefin resin particles may be added to surfactant aqueous solution containing solubilized or finely dispersed organic peroxide as cross-linking agent, then diluting the solution with additional water heated to a temperature just below the temperature that the resin particles begin to melt, and then adding inorganic metallic salt to the resulting solution.

At any time, before starting cross-linking reaction, in the course of the reaction or after completing the reaction, the foaming agent may be added to the homogeneously cross-linked polymer particles which contain 10% to 70% gel fraction, by an impregnation method which is well known. For example, to cross-linked polymer particles, foaming agent may be impregnated under a certain pressure. If necessary the entire system may be heated under stirring. A flowing method under heating is also preferable. Various methods of heating may be used:

Pre-foaming process of foamable cross-linked polyethylenic polymer particles which contain foaming agent is performed, preferably, by exposing to heated air, steam, infra-red irradiation, high frequency magnetic field or heated liquid without ability to dissolve the foamed material, at 100°C to 300°C, under atmospheric, increased or reduced pressure. The pressure and type of heat, and exact temperature are selected depending upon the properties and features of foamed polyethylenic polymer particles.

The ratio of foaming at the initial pre-foaming stage is desired to be about 5 to 30 times the original particle size. Pre-foamed particles are stored in an atmosphere of foaming agent, either immediately after pre-foaming steps, or after pre-foaming and then exposing to atmospheric air. Holding the pre-foamed particles in atmosphere of foaming agent is performed by a method in which pre-foamed particles are placed in a high pressure vessel, to which foaming agent is introduced. Thereafter the particles are held at a desired pressure and temperature for a desired length of time.

Also, the storing may be by a method in which pre-foamed particles are passed through atmosphere of foaming agent. Selection of pressure, temperature, holding time and type of foaming agent should be made, dependent upon type of substrate resin, desired rate of foaming, desired quality of expanded shaped product, etc. Holding pressure should not be so high as to squeeze the particles out of shape.

Moreover, pre-foamed particles may be held in mixture of foaming agent gas and inert gas, such as carbon dioxide or nitrogen at an increased pressure. Process for storing or holding pre-foamed particles in atmosphere of foaming agent prior to molding may either be of just one step or be repeated to be more than one step. selection of the number of processing steps can be made dependent upon the desired quality of expanded shaped product, properties and features of expandable polyethylene series polymers and others.

Pre-foamed particles held with foaming agent in atmosphere of foaming agent, sometime immediately after exposure to foaming agent or during the time of holding foaming agent gas impregnated in pre-foamed particles, may be subjected to placement in and filling in a closable mold which has never been or cannot be closed tightly, and molding to produce good quality molding product with any desired shape.

The following examples illustrate the present invention.

EXAMPLE 1

In a high pressure vessel, 100 parts of high pressure polyethylene (Trademark MIRASON-9, a product of Mitsui Polychemicals Co, Ltd) of 3 to 4 mm in diameter and 135 parts of water were charged. Under stirring, there was then added a mixture which was prepared by solubilizing or finely dispersing 0.45 parts of dicumyl peroxide in 15 parts of water containing 0.05 parts of NEOPELEX with heating under stirring. To the resultant mixture there were further added 50 parts of water containing 0.3 parts of calcium phosphate. After flushing with nitrogen gas, this mixture was heated for 2 hours at 100°C and then for 4 hours at 140°C.

The product was taken out, washed with water and dried to give cross-linked polyethylene particles without adhering between particles. The cross-linked polyethylene particles contained 51% of gel fraction (insoluble part after subjecting to extraction procedure with boling xylene for 48 hours). The percentage as used herein are in terms of percentage by weight.

The resulting cross-linked polyethylene particles were impregnated with 8% by weight of dichlorodifluoro methane and heated to be foamed. The foamed polyethylene thus obtained was found to be in a cell structure foamed homogeneously and finely with homogeneous formation of cross-linking through the foamed resin.

EXAMPLE 2

Into a pressure vessel there was charged 1 part of water containing 0.3 part of zinc phosphate prepared with trisodium phosphate aqueous solution and zinc chloride aqueous solution. Under stirring was added a mixture which was prepared by solubilizing or finely dispersing 1 part of dicumyl peroxide in 20 parts of water containing 0.1 part of NEOPELEX with heating under stirring. To the resulting solution were further added 100 parts of high pressure polyethylene (Trademark MIRASON-9, a product of Mitsui Polychemicals Co, Ltd) of 3mm to 4 mm in diameter. After flushing with nitrogen gas, this mixture was heated for 2 hours at 105°C and 8 hours at 120°C to 130°c.

The product was removed, washed with water and dried to give cross-linked pollyethylene particles without any adhering between particles.

The product contained 72% of gel fraction.

The resulting cross-linked polyethylene particles were impregnated with 10% by weight of dichlorodifluoro methane and heated to be foamed thereby. The foamed polyethylene thus obtained was found to be in a cell structure foamed homogeneously and with homogeneous formation of cross-linking through the foamed resin.

EXAMPLE 3

Into a pressure vessel there was charged 100 parts of high pressure polyethylene (Trademark MIRASON-9, a product of Mitsui Polychemicals Co. Ltd) of 3 mm to 4 mm in diameter. Then, under stirring, there was added a mixture, which was prepared by solubilizing or finely dispersing 0.4 part of dicumyl peroxide in 15 parts of water containing 0.05 parts of NEOPELEX with heating under stirring and then 50 parts of water containing 0.03 part of aluminum hydroxide made from aluminum chloride and sodium hydroxide. After substituting air in the upper space of the vessel with nitrogen gas, this mixture was heated for 2 hours at 100°C and for 7 hours at 130°C.

The content of the vessel was removed, washed with water and dried to give cross-linked polyethylene particles having excellent particle appearance.

The cross-linked polyethylene particles thus obtained had a gel content of 48%.

The cross-linked polyethylene particles were impregnated with 9% by weight of dichlorotetrafluoro ethane and heated to be formed. The foamed polyethylene thus obtained was formed to be in a cell form foamed homogeneously, and finely, with homogeneous formation of cross-linking throughout the foamed resin.

EXAMPLE 4

Into a pressure vessel there was charged 100 parts of high pressure polyethylene (Trademark, MIRASON-9, a product of Mitsui Polychemicals Co, Ltd) of 3mm to 4mm in particle diameter and 150 parts of water. Then, under stirring, there was added a mixture which was made by solubilizing and finely dispersing 0.45 parts of dicumyl peroxide in 15 parts of water containing 0.05 parts of dodecyl sodium benzene sulfonate (Trademark, NEOPELEX, a product of Kao Soap Co., Ltd) under stirring at an elevated temperature.

After degassing and filling the upper part of the vessel with nitrogen gas, the mixture was heated for 2 hours at 100°C to impregnate polyethylene particles with the organic peroxide. There, there was added 35 parts of water and 0.25 parts of calcium phosphate prepared from the reaction of trisodium phosphate aqueous solution and calcium chloride aqueous solution. There was then further added 12 parts of foaming agent, dichlorodifluoro methane, followed by heating for 6 hours at 135°C. After cooling, the entire content of the vessel was removed, washed with water, and dried to give foamable cross-linked polyethylene particles.

The product contained 8% foaming agent and had 52% gel fraction, by weight of resin particles. When the product was heated by steam of a pressure of 0.8 kg/cm² for 25 seconds, it foamed up to 200 cc/10g (degree of foaming, apparent volume of foamed product measured by putting in a measuring cylinder)

EXAMPLE 5

Into a pressure vessel there was charged 100 parts of high pressure polyethylene (Trademark MIRASONE-9, a product of Mitsui Polychemicals Co, Ltd) of 3mm to 4 mm in particle diameter, a mixture of 185 parts of water and 0.4 parts of zinc phosphate, prepared by adding zinc chloride aqueous solution to trisodium phosphate aqueous solution, and a mixture prepared by solubilizing or finely dispersing 0.5 parts of dicumyl peroxide in 15 parts of water containing 0.05 part of NEOPELEX under stirring at an elevated temperature. After degassing and filling the upper part of the vessel with nitrogen gas, 14 parts of dichloro tetrafluoroethane were added. This mixture was heated at 105°C for 1.5 hours and at 120°C to 130°C for 8 hours. After cooling, the entire content of the vessel was removed, filtered, washed with water and dried to produce foamable cross-linked polyethylene particles.

The product contained 9% of foaming agent and had 55% gel fraction. When this product was heated by steam of a pressure of 1.5 kg/cm² for 30 seconds, it foamed to 180 cc/10g degree of foaming.

EXAMPLE 6

Into a pressure vessel there was charged 100 parts of high pressure polyethylene (Trademark, MIRASONE-9, a product of Mitsui Polychemicals Co, Ltd) of 3mm to 4mm particle diameter, a mixture prepared by solubilizing and finely dispersing 0.4 part of dicumyl peroxide in 15 parts of water containing 0.05 part of NEOPELEX, and calcium phosphate aqueous solution prepared by reacting 100 parts of water containing 0.613 part of trisodium phosphate and 85 parts of water containing 0.453 part of calcium chloride dihydrate were put under stirring and mixed thoroughly. After degassing and filling the upper part of the vessel with nitrogen gas, the mixture was heated at 100°C for 2 hours, then at 135°C for 6 hours and cooled. The entire content of the vessel was removed, filtered, washed with water and dried to give cross-linked polyethylene.

100 parts of cross-linked polyethylene particles thus obtained were placed in a vessel. Then 14 parts of dichloro difluoro methane were added, and heated at 41°C for 11 hours and then cooled. The resulting product which was removed from the vessel, was foamable cross-linked polyethylene particles. The foamable cross-linked polyethylene particles contained 11% of foaming agent and had 50% gel fraction.

When this product was heated for 30 seconds by steam of a pressure of 0.8 kg/cm², it foamed to 220 cc/10g degree of foaming.

EXAMPLE 7

Into a high pressure vessel was charged, under stirring, calcium phosphate aqueous solution prepared from 100 parts of water containing 0.613 part of trisodium phosphate and 8.5 parts of water containing 0.453 part of calcium chloride dihydrate. There was added a solution prepared by solubilizing or finely dispersing 0.4 part of dicumyl peroxide in 15 parts of water containing 0.05 part of NEOPELEX (A Trademark of Kao Soap Co, Ltd, and containing sodium dodecyl benzen-sulfate) with heating and stirring, and 100 parts of high pressure polyethylene (Trademark, MIRASONE-9, a product of Mitsui Polychemicals Co, Ltd) having particles of 3mm to 4mm size. The upper part of the vessel was evacuated and filled witn nitrogen gas. After heating the vessel at 100°C for 2 hours, then at 135°C for 6 hours, the entire content was cooled, removed from the vessel, filtered off, washed with water and dried in open air to produce cross-linked polyethylene particles.

The product had 50% gel fraction. One hundred parts of cross-linked polyethylene particles thus obtained were put in a high pressure vessel, to which was added 13 parts of dichlorodifluoromethane and heated at 80°C for 5 hours followed by cooling. The entire content of the vessel was removed to obtain foamable and cross-linked polyethylene particles. The product contained 10.5% foaming agent based on the weight of the particles.

When the product was heated by steam having a vapor pressure of 0.8 kg/cm² for 25 seconds it was foamed up to 200cc/10g degree of foaming (apparent volumne of foamed product measured by putting in a measuring cylinder).

The pre-foamed product was put into a high pressure vessel, and exposed to dichloro difluoro methane at 25°C and at a gas pressure of 3 kg/cm². After absorbing 13% of the gas, the product was removed from the vessel, filled in a closing mold having small holes, and heated with steam of a pressure of 2 kg/cm² for 90 seconds, followed by cooling to form good quality product having specific gravity of 0.050.

EXAMPLE 8

Into a high pressure vessel there were put under stirring, 100 parts of high pressure polyethylene (Trademark, MIRASONE-9, a product of Mitsui Polychemicals Co, Ltd) having particle size of 3mm to 4 mm, and 150 parts of water. There was added a mixture prepared by solubilizing or finely dispersing 0.45 part of dicumyl peroxide in 15 parts of water containing 0.05 part of NEOPELEX and 35 parts of water containing 0.25 parts of calcium phosphate which is prepared from trisodium phosphate and calcium chloride. The upper empty portion of the vessel was evacuated and filled with nitrogen gas. 12 parts of dichloro-tetrafluoro-ethylene was added. After heating the vessel at 100°C for 2 hours, then at 135°C for 6 hours, the entire content was cooled, taken out of the vessel, filtered off, washed with water and dried in open air to produce foamable and cross-linked polyethylene particles.

The product which had 52% gel fraction and 9% foaming agent, was heated with use of steam of a vapor pressure of 1.5 kg/cm² for 30 seconds to form pre-foamed product having degree of foaming of 190 cc/10g.

The resulting pre-foamed product was placed in a high pressure vessel, exposed to dichloro-tetrafluoro ethane having a gas pressure of 2.5 kg/cm². After absorbing 14% of the gas, the product was removed from the vessel, filled in a mold, and heated by using steam of a vapor pressure of 2.5 kg/cm² for 90 seconds, followed by cooling in water to obtain good quality products having specific gravity of 0.051.

EXAMPLE 9

Using pre-foamed product having the foaming extent of 190 cc/10g, such as prepared in Example 7 or 8, the pre-foamed product was placed in a high pressure vessel, exposed to dichloro-difluoro methane at a gas pressure of 3 kg/cm² at 25°C. After absorbing 15% of the gas, the foamed product was taken out of the vessel, again foamed by heating with steam having a vapor pressure of 0.5 kg/cm² for 30 seconds, to form formed product having foaming extent of 340 cc/10g. The resulting foamed product was again placed in a high pressure vessel and exposed to dichloro-difluoro methane at a gas pressure of 3 kg/cm² at 25°C. After absorbing 18% of the gas, the product was removed from the vessel, filled in a mold having small holes and heated with steam of a vapor pressure of 2.5 kg/cm² for 90 seconds, followed by cooling with water to give good quality product having specific gravity of 0.030.

EXAMPLE 10

The cross-linked polyethylene particles obtain in Example 1, except using 0.286 parts calcium phosphate, were washed sufficiently with water and dried. A sample for fluorescen X-ray analysis was made from the particles; namely, the particles were put between TEFLON plates and pressed at 160°C for 15 minutes to a disk having diameter 3.8 cm and thickness 2.3 mm.

The fluoresence X-ray analysis was carried out by using the fluoresence X-ray measurement apparatus of the Rigakudenki Type KG-X4. The measurement condition was as follows.

An X-ray tube bulb which has a target part made of chromium was used. Germanium was used as spectrum crystal. The electric current and voltage were set to 50 kilovolts and 40 miliampere. The spectrum of phosphorus was set to PK = 140.9° and 139° was used as background. X-ray path was brought to vaccum, $10^{-3}$ mm Hg. Flor-PC was selected as detector and the electric voltage was set to 1900 volts. Timer was set to 20 seconds. Multiplier was set to X1. Analysis was set to Difference. Namely, in order to obtain maximum value of intensity of phosphorus, course gain is set to 4, base line is set to 50, and channel width was set to 350. Next, the sample of disk having diameter 3.8 cm and thickness 2.5 mm was inserted into a sample chamber, and X-ray intensity was measured with count per second (C.P.S.) by fixed time method. The concentration of phosphorus in polymer was obtained by using calibration curve from this X-ray intensity. (C.P.S.).

The calibration curve was made previously by using samples to which were added known amounts of phosphorus. By this method 0.055% (i.e. 550 ppm) of phosphorus was found in the resulting cross-linked polyethylene particles.

Before the same polyethylene particles were cross-linked in water dispersion system, the polyethylene particles were measured in the same manner by X-ray fluorescence analysis and 0.0018% (i.e. 18 ppm) of phosphorus was found in the polyethylene particles.

Thus, it was concluded that 100 parts of the cross-linked polyethylene particles contained 0.053 parts of phosphorus, namely, 0.286 part of calcium phosphate by cross-linking reaction in water dispersion system using calcium phosphate as dispersion agent. The particles had adhered to the surfaces thereof the calcium phosphate.

EXAMPLE 11

The expanded shaped product obtained in Example 6, except using 0.286 part of calcium phosphate to 100 parts of polyethylene, were analyzed in the same manner as in Example 10 by fluorescence analysis, and 0.53%(i.e. 530 ppm) of phosphorus was found in the expanded shaped articles of the cross-linked polyethylene. The particles has adhered to the surfaces thereof the calcium phosphate.

It was thus concluded that the expanded shaped articles included 0.053 part of phosphorus, namely, 0.286 part of calcium phosphate to 100 parts of the expanded shaped articles of the cross-linked polyethylene.

The foregoing description is intended to illustrate the principles of the invention. Numerous other variations and modifications thereof would be apparent to the worker skilled int the art. All such variations and modifications are to be considered to be within the spirit and scope of the invention.

What is claimed is:

1. A method of manufacturing polymer particles having uniform cross-linking comprising the steps of suspending in water particles of polyolefin resin, surface active agent, organic peroxide cross-linking agent, and inorganic metallic salt, and heating said suspension system to a temperature sufficient to cause penetration of said cross-linking agent into said particles, and cross-linking reaction.

2. A method of manufacturing foamable cross-linked polymer particles, comprising the steps of dispersing in water polyolefin resin particles, surface active agent, organic peroxide cross-linking agent and inorganic metallic salt, heating said dispersion at a temperature sufficient to cause said cross-linking agent to impregnate said particles and cross-linking reaction thereby to produce homogeneous cross-linked polymer particles having gel content of between 10% to 70%, and adding foaming agent.

3. A method of manufacturing expanded shaped product of polyolefin resin, comprising the steps of dispersing polyolefin resin particles, surface active agent, organic peroxide cross-linking agent and finely pulverized difficulty soluble inorganic salt in water, heating said aqueous dispersion to a temperature sufficient to cause said cross-linking agent to impregnate into said resin particles and cross-linking reaction thereby to produce homogeneous cross-linked polymer particles having gel fraction of 10% to 70%, adding foaming agent to said particles, pre-foaming the resulting product, preserving the resulting polymer in foaming agent, and subjecting said pre-foamed polymer to foaming with use of heat in an open or closable mold which cannot be closed tightly.

4. Method of claim 1, wherein said cross-linking agent is used in an amount up to 3% by weight of said resin, and is selected from the group consisting of dicumyl peroxide, 2.5 dimethyl 2.5 (di-tertiary butyl peroxy)hexane, di-tertiary butyl perphthalate, tertiary butyl hydroperoxide and mixtures thereof.

5. Method of claim 4, wherein there is further added to said cross-linking agent a polyfunctional monomer.

6. Method of claim 1, wherein said surface active agent is selected from the group consisting of polyoxyethylene octyl phenol ether, dodecyl benzene sulfonate, sodium dialkyl sulfosuccinate and mixtures thereof.

7. Method of claim 6, wherein said surface active agent is used in an amount of from 5 to 50 percent by weight of said cross-linking agent.

8. Method of claim 1, wherein said inorganic metallic salt is used in an amount of up to 1% by weight of said resin and is selected from the group consisting of metallic phosphates, metallic oxides, and metallic hydroxides.

9. Method of claim 2, wherein said foaming agent is used in an amount of from 1% to 20% by weight of said resin.

10. Method of claim 3, wherein said pre-foaming comprises heating at between 100°C and 300°C, and expanding to about 5 to 30 times the original particle size.

11. Method of claim 3, wherein said prserving is in a mixture of foaming gas and an inert gas.

12. Polymer particles produced by the method of claim 1 wherein said inorganic metal salt is adhered to the surfaces of said particles.

13. Foamable cross-linked polymer particles produced by the method of claim 2.

14. Expanded shaped product produced by the method of claim 3, wherein said inorganic metal salt is adhered to the surfaces of said particles.

* * * * *